United States Patent
Rodgers et al.

(10) Patent No.: US 9,770,863 B2
(45) Date of Patent: *Sep. 26, 2017

(54) SYSTEMS AND METHODS TO REDUCE AIR POCKET FORMATION DURING WELDING

(71) Applicant: GM GLOBAL TECHNOLOGY OPERATIONS LLC, Detroit, MI (US)

(72) Inventors: William A. Rodgers, Bloomfield Township, MI (US); Hamid G. Kia, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 293 days.

This patent is subject to a terminal disclaimer.

(21) Appl. No.: 14/568,792

(22) Filed: Dec. 12, 2014

(65) Prior Publication Data

US 2016/0167288 A1    Jun. 16, 2016

(51) Int. Cl.
  *B32B 37/00*  (2006.01)
  *B29C 65/08*  (2006.01)
  *B29C 65/00*  (2006.01)
  *B29K 105/12*  (2006.01)
  *B29K 105/26*  (2006.01)

(52) U.S. Cl.
  CPC ............ *B29C 65/08* (2013.01); *B29C 66/112* (2013.01); *B29C 66/114* (2013.01);
  (Continued)

(58) Field of Classification Search
  CPC ... B29C 65/08; B29C 66/112; B29C 66/1122; B29C 66/114; B29C 66/30221; B29C 66/342; B29C 66/81422; B29C 66/836
  (Continued)

(56) References Cited

U.S. PATENT DOCUMENTS 3,533,865 A    10/1970  Bocquet et al.
3,602,257 A *   8/1971  Berleyoung ............ B29C 65/08
                                                    137/594

(Continued)

FOREIGN PATENT DOCUMENTS

DE    69225545 T2    10/1998
WO       9517305       6/1995

OTHER PUBLICATIONS

German Office Action dated Mar. 23, 2017 for corresponding German Patent Application No. 102015120717.6.

*Primary Examiner* — James Sells
(74) *Attorney, Agent, or Firm* — Mickki D. Murray; Park IP Law LLC

(57) ABSTRACT

The present technology discloses a system, for joining workpieces using energy, such as ultrasonic energy, where the energy concentrates at a location within a weld area, promoting sequential melting of a plurality of energy directors. The system can be configured so that the sequential melting begins at the center of the weld area and progresses outwards. Sequential melting may occur through use of a welding tip configured to reduce air pockets, a tapering the height of a plurality of energy directors, and/or tapering the energy directors themselves, all of which reduce the size of an energy transfer area produced by thermal energy. The present technology also includes a method for joining workpieces using energy such as ultrasonic energy that concentrates at a location within a weld area causing sequential melting of a plurality of energy directors using the aforementioned features.

20 Claims, 7 Drawing Sheets

(52) U.S. Cl.
CPC .... *B29C 66/1122* (2013.01); *B29C 66/30221* (2013.01); *B29C 66/342* (2013.01); *B29C 66/81422* (2013.01); *B29C 66/836* (2013.01); *B29C 66/21* (2013.01); *B29C 66/232* (2013.01); *B29C 66/71* (2013.01); *B29C 66/721* (2013.01); *B29C 66/7212* (2013.01); *B29C 66/72143* (2013.01); *B29C 66/7392* (2013.01); *B29C 66/73921* (2013.01); *B29C 66/81419* (2013.01); *B29K 2105/122* (2013.01); *B29K 2105/124* (2013.01); *B29K 2105/126* (2013.01); *B29K 2105/26* (2013.01); *B29K 2995/0056* (2013.01)

(58) Field of Classification Search
USPC .................................. 156/73.1, 580.1, 580.2
See application file for complete search history.

(56) References Cited

U.S. PATENT DOCUMENTS

| | | |
|---|---|---|
| 4,090,799 A | 5/1978 | Crotti et al. |
| 5,411,616 A * | 5/1995 | Desai ...................... B29C 65/08 156/580.1 |
| 5,593,620 A * | 1/1997 | Galas ................. B29C 33/0016 156/580.2 |
| 8,986,478 B2 * | 3/2015 | Bucker ................. B29C 65/082 156/308.2 |

* cited by examiner

Fig_2
(PRIOR ART)

Fig_3

Fig_4

Fig_5

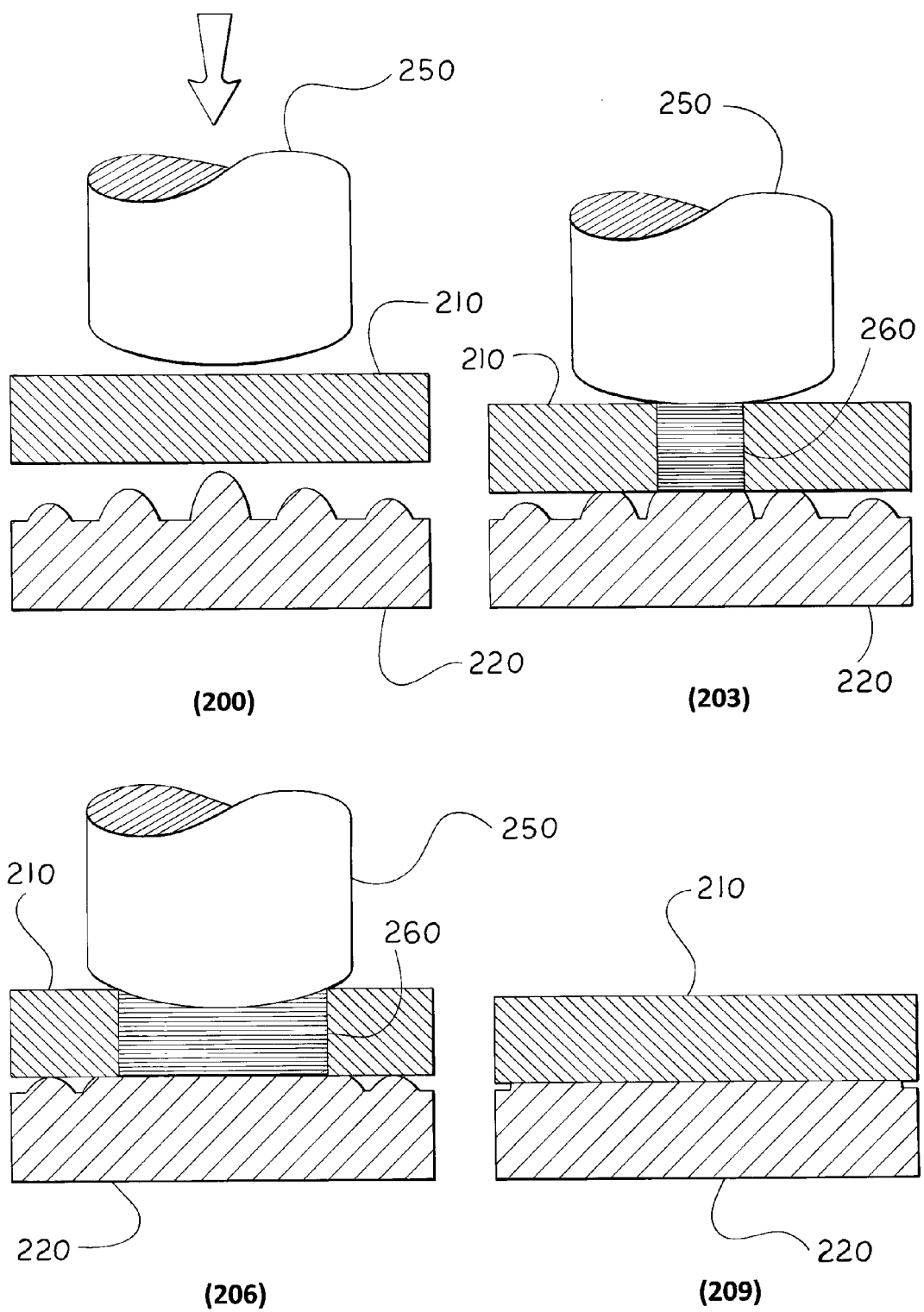
Fig_7

US 9,770,863 B2

SYSTEMS AND METHODS TO REDUCE AIR POCKET FORMATION DURING WELDING

TECHNICAL FIELD

The present technology relates generally to connecting workpieces by welding. More specifically, the present technology relates to systems and methods for avoiding formation of air voids within a weld joining composite materials.

BACKGROUND OF THE TECHNOLOGY

Ultrasonic welding is an industrial technique whereby high-frequency ultrasonic acoustic vibrations are locally applied to workpieces being held together under pressure to create a solid-state weld. This technique is commonly used for plastics, such as to join dissimilar materials. The technique is used in industries such as automotive, appliance, electronic, toy, packaging, textile, and medical, among others.

Energy directors are raised portions of material molded, set, affixed, or otherwise in contact with or positioned adjacent to a surface of a workpiece used during ultrasonic welding. Energy directors concentrate ultrasonic energy to rapidly initiate softening and melting of surfaces at a joining interface.

FIG. 1 illustrates a conventional process of ultrasonic welding to bond a first workpiece 110 with a second workpiece 120. As shown in step 100, the first workpiece 110 is positioned in contact with the second workpiece 120, which includes a plurality of energy directors 130. A welding tip 150 is positioned near an upper surface of the first workpiece 110. The welding tip 150 typically has a beveled (e.g., chamfered) edge designed to contacts the upper surface of the first workpiece 110.

At step 106, the welding tip 150 contacts the upper surface of the first workpiece 110, creating an energy transfer area 160, initially formed by a contact area between the beveled edge of the welding tip 150 and the upper surface of the first workpiece 110. Each of the energy directors 130 directly adjacent the energy transfer area 160 begins to melt at the same time due to ultrasonic vibrations from the welding tip 150 passing through the energy transfer area 160 and generating heat within each of the energy directors 130. Ultimately, the energy transfer area 160 may expand through some or all of the first workpiece 110. Additionally the energy transfer area 160 may expand through some or all of the energy directors 130 and/or the second workpiece 120.

FIG. 2 illustrates a perspective view of the conventional ultrasonic welding process. Specifically, FIG. 2 illustrates the grandness of the energy transfer area(s) 160 as the welding tip 150 travels along a directed path, illustrated by an arrow. The welding tip 150 may travel continuously or in discrete intervals across the first workpiece 110. Where discrete intervals are used, the welding tip 150 (i) forms a weld within a first weld area, (ii) raises from the first weld area, (iii) travels to a second weld area, and (iv) lowers to form a second weld within the second weld area.

Referring back to FIG. 1, at step 109, the workpieces 110 and 120 join to form a weld having a weld width 170. As shown, air pockets 180 are formed within the weld width 170. When the energy directors 130 melt, air is trapped within the weld, forming the air pockets 180 shown developing at step 106 and present in the final product at step 109. Air pockets 180 weaken strength of the weld and can lead to premature failure.

SUMMARY OF THE TECHNOLOGY

Due to the aforementioned deficiencies, the need exists to create an ultrasonic weld with reduced and/or eliminated presence of air pockets. The proposed systems and methods would arrange energy directors or alternatively a welding tip reduced and/or eliminated presence of air pockets within the ultrasonic weld.

According to the present technology, energy directors would be arranged and/or configured in a pre-determined manner to avoid air gap formation. In one embodiment, the directors have differing heights, such as to form one or more tapered profiles. Alternatively, or in addition, one or more of the energy directors can themselves have a tapered profile.

Additionally, a welding tip could be arranged and/or configured in a pre-determined manner to avoid air gap formation. In one embodiment, the welding tip itself forms a tapered profile. In one embodiment, the energy directors, each having a tapered profile and/or differing heights, may be used in conjunction with the welding tip having the tapered profile.

In one embodiment, a system for joining workpieces is configured so that the ultrasonic energy concentrates at one or more locations within a weld area, promoting sequential melting of a plurality of energy directors.

In some embodiments, a welding tip is specially configured to reduce air pockets in the ultrasonic weld. In conventional welding systems (e.g., FIG. 1), due to minor variations in the surfaces of the materials of the workpieces, air can be trapped during formation of a joint between a first workpiece and a second workpiece. The welding tip configured to reduce air pockets is in one embodiment configured to promote weld formation that begins at a center of an energy transfer area, where thermal heat produced by ultrasonic vibrations of the welding tip configured to reduce air pockets is transferred through the first workpiece. In some embodiments, the welding tip configured to reduce air pockets reduces the size of the energy transfer area that is formed during ultrasonic welding when compared to conventional welding tips. The weld then progresses from the center of the energy transfer area outward within the joint being formed.

In some embodiments, the welding tip is specially configured to reduce air pockets in the ultrasonic weld by promoting sequential melting of the plurality of energy directors. A benefit of the welding tip configured to reduce air pockets is that it creates a relatively small energy transfer area, promoting sequential melting of energy directors, which allows space surrounding each energy director to be filled prior to melting (e.g., prior to complete or substantial melting) of adjacent energy directors, thus reducing or eliminating air pockets within the weld area.

In one embodiment, reduction of the energy transfer area causes a center of a weld width to receive greater energy transfer, causing energy directors at the center of the weld width to melt first.

In some embodiments, the energy directors, each having a tapered profile and/or differing heights, promote sequential melting of the plurality of energy directors. Profiling the height of the energy directors on the second workpiece promotes the energy directors to melt sequentially as the first workpiece. Melting the energy directors sequentially, rather than at the same time as in conventional techniques, reduces or eliminates air pockets within the weld.

In one embodiment, the system including the energy directors is configured so that an energy director positioned at a center of the weld area melts first. As the first workpiece increases in temperature by energy transferred from the welding tip, the molecules within the center energy director, in contact with the first workpiece, begin to increase in temperature. An increase in temperature causes molecules within the center energy director to vibrate, producing thermal energy that melts the center energy director. Melting of the center energy director is followed by thermal heating, caused by vibration of molecules, in adjacent energy directors, thus causing melting of the adjacent energy directors.

In some embodiments, the welding tip configured to reduce air pockets is used in conjunction with the tapered profile of any of energy director height and/or shape.

The present technology also includes a method for joining workpieces using ultrasonic energy wherein, using any of the aforementioned features, the ultrasonic energy concentrates at a location or area within a weld width, causing sequential melting of a plurality of energy directors.

Other aspects of the present technology will be in part apparent and in part pointed out hereinafter.

DESCRIPTION OF THE DRAWINGS

FIG. 7 illustrates a process of ultrasonic welding using the exemplary ultrasonic welding assembly of FIG. 3.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components herein in connection with one or more functions is to be interpreted to cover embodiments in which a single component performs the function(s).

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

I. OVERVIEW OF THE DISCLOSURE—FIGS. 3 THROUGH 6

Figure 3:
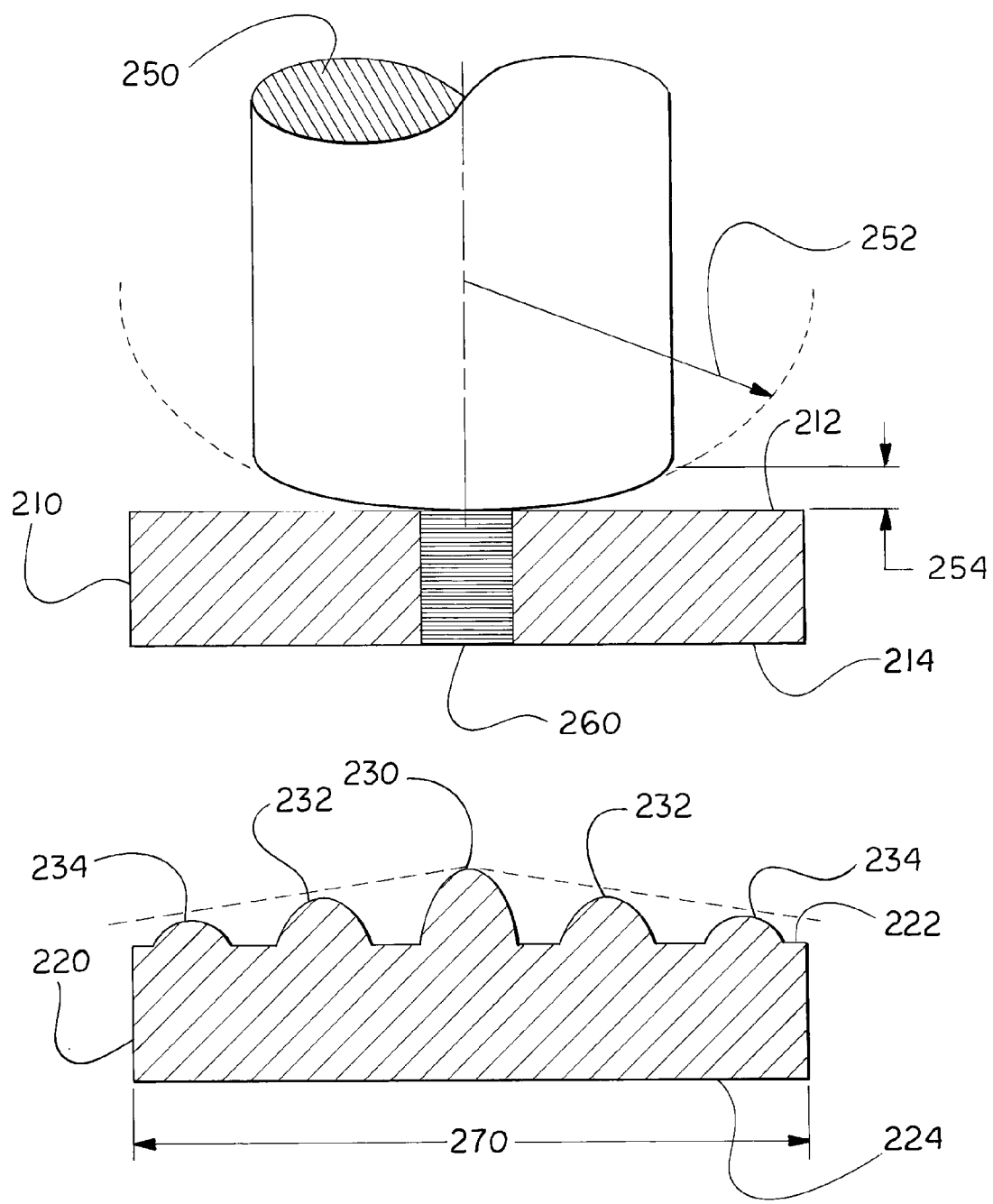
FIG. 3 illustrates a side view of an exemplary ultrasonic welding assembly, using a modified ultrasonic welding tip and a tapered profile in energy director height.

FIG. 3 illustrates a welding system including a first workpiece 210 and a second workpiece 220 to be bonded by welding. While ultrasonic welding is described as a primary example, herein, the technology can include other types of welding, and is not limited to ultrasonic welding. The first workpiece 210 and the second workpiece 220 may be similar in material structure. For example, the first workpiece 210 and the second workpiece 220 may both be composed of a polymer composite material. Conversely, the first workpiece 210 can be of a different material than the second workpiece 220.

In some embodiments, one or more of the workpieces 210, 220 may include but are not limited to polymers such as (functionalized) polycarbonate, polyolefin (e.g., polyethylene and polypropylene), polyamide (e.g., nylons), polyacrylate, or acrylonitrile butadiene styrene.

In other embodiments, one or more of the workpieces 210, 220 may include, but are not limited to, composites such as reinforced plastics. The reinforced plastics may include any of the exemplary polymers listed above, and the reinforcement may include one or more of the following: clay, glass, carbon, polymer in the form of particulate, (nano, short, or long) fibers, (nano-sized or micron-sized) platelets, whiskers, among others.

At least one of the workpieces 210, 220 can include synthetic, or inorganic, molecules. While use of so-called biopolymers (or, green polymers) is increasing, petroleum-based polymers are still much more common. Material of one or both of the workpieces 210, 220 may also include recycled material, such as a polybutylene terephthalate (PBT) polymer, which is about eighty-five percent post-consumer polyethylene terephthalate (PET). In one embodiment, one or both of the workpieces 210, 220 includes some sort of plastic. In one embodiment, the material includes a thermoplastic.

In one embodiment, one or both of the workpieces 210, 220 includes a composite. For example, in one embodiment one or both of the workpieces 210, 220 includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite (e.g., plastic composite containing metal reinforcing fibers). The material in some implementations includes a polyamide-grade polymer, which can be referred to generally as a polyamide. In one embodiment, the material of one or both of the workpieces 210, 220 includes acrylonitrile-butadiene-styrene (ABS). In one embodiment, the material of one or both of the workpieces 210, 220 includes a polycarbonate (PC). Material of one or both of the workpieces 210, 220 may also comprise a type of resin. Example resins include a fiberglass reinforced polypropylene (PP) resin, a PC/PBT resin, and a PC/ABS resin.

The first workpiece 210 includes an upper surface 212 and a lower surface 214, and the second workpiece 220 includes an upper surface 222 and a lower surface 224. The lower surface 214 of the first workpiece 210 and the upper surface 222 of the second workpiece contact upon joining of the workpieces 210, 220 and are secured to one another.

Figure 1:
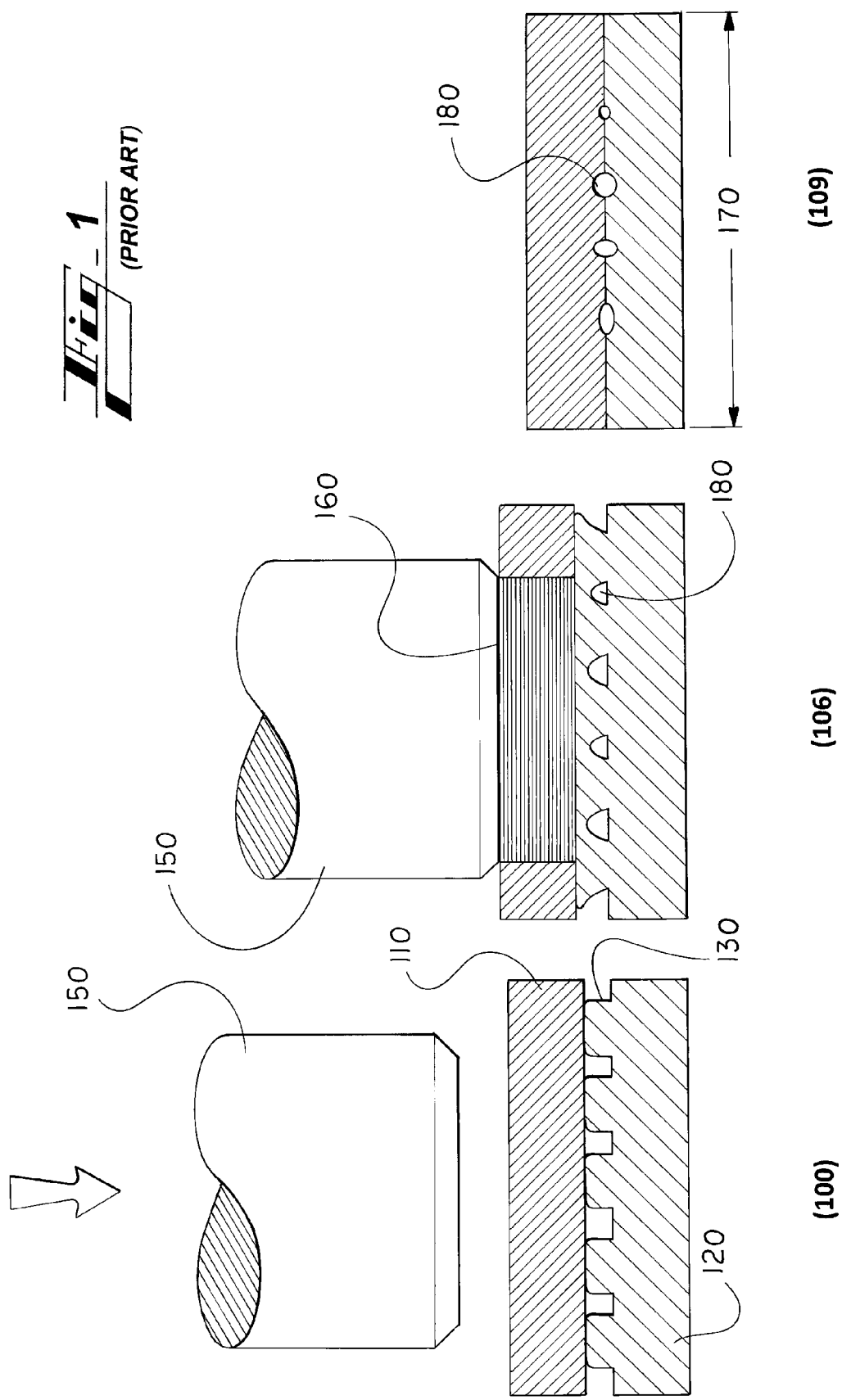
FIG. 1 illustrates a conventional process of ultrasonic welding using energy directors.
Figure 2:
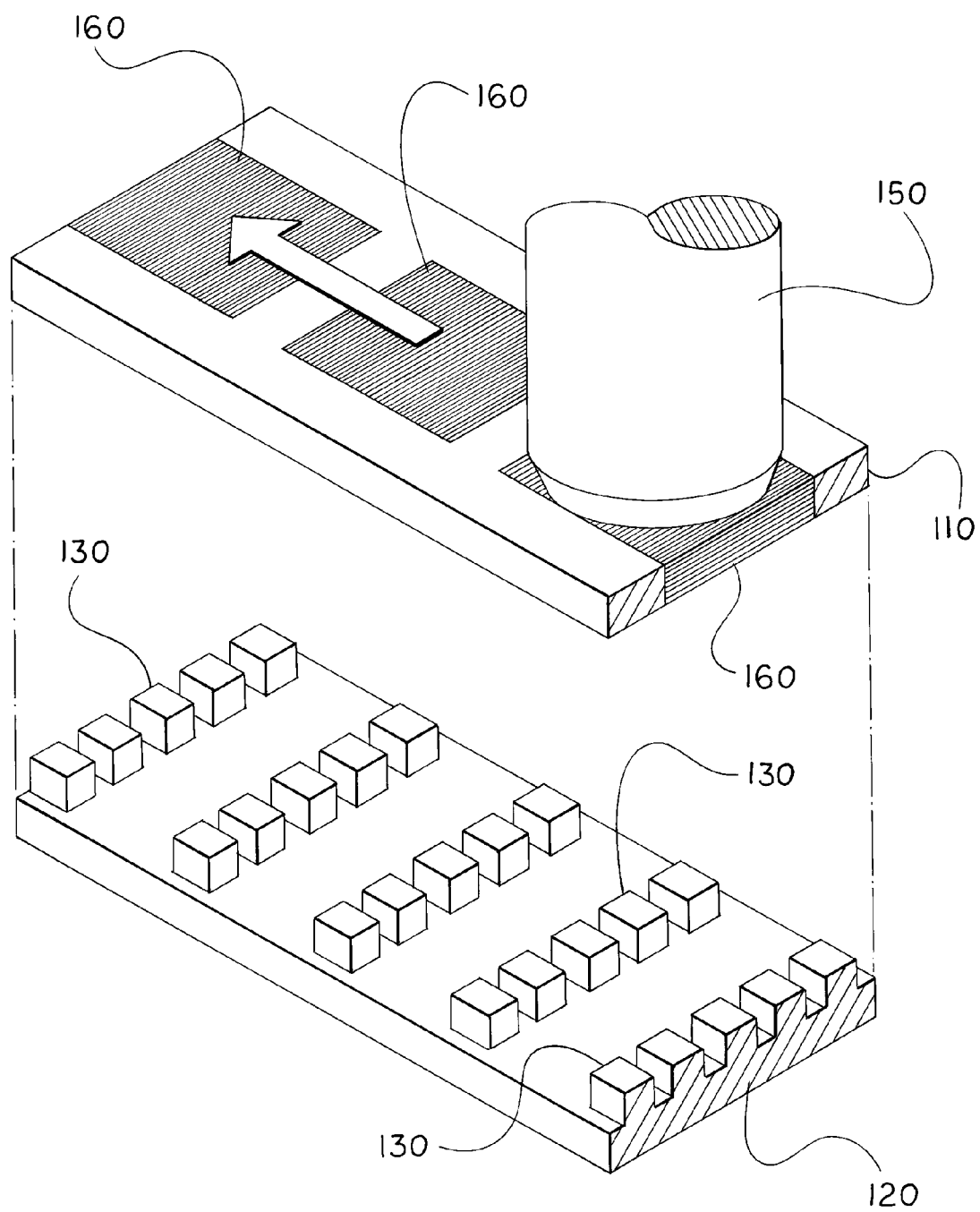
FIG. 2 illustrates a perspective view of the conventional process of FIG. 1.

One reason the process described in the conventional technique (e.g., FIG. 1) generates air pockets is that ultrasonic energy is concentrated over a large surface area of the first workpiece 110. In the present technology, to reduce and/or eliminate air pockets within a weld, ultrasonic energy applied to the first workpiece 210 can be concentrated at one or more locations, e.g., at a center, of a weld area 240 (shown in FIGS. 4 and 5). To direct ultrasonic energy, e.g., towards the center of the weld area 240, (i) the energy directors can form a tapered height profile across a width of the weld, (ii) at least one of the energy directors can, itself, have a tapered profile, and/or (iii) the shape of the welding tip can be tapered to minimize the energy transfer area.

A. Energy Directors

One way to direct ultrasonic energy within, such as towards the center of, the weld area 240 is to taper the height of the energy directors across a weld width 270. An exemplary illustration of a tapered-height profile or shape is depicted in FIG. 3 where a peak aligns with the center of an energy transfer area 260, formed by initial contact with the welding tip. As described in association with FIG. 7, the energy transfer area 260 may continue to expand some or all of the material of the first workpiece 110 and/or the second workpiece 220 by way of the energy directors.

The energy directors can be located on either the first workpiece 210, the second workpiece 220, or both. In some embodiments, the energy directors are located on the workpiece that is in contact with the welding tip. For example, where the workpieces 210, 220 include similar materials, the energy directors can be placed on the first workpiece 210 being in contact with the welding tip. The welding tip 250 may be a specially configured as mentioned and as shown in FIG. 3.

In other embodiments, where the workpieces to be welded are of different materials, the energy directors are placed on or part of the workpiece with the highest melt temperature and/or stiffness. For example, with reference to FIG. 3, where the workpieces 210, 220 comprise different materials, the energy directors can be placed on the second workpiece 220, which has a higher melt temperature than the first workpiece 210.

In other embodiments, where the workpieces to be welded are of different materials, the energy directors can be placed on the workpiece with the lowest melt temperature and/or stiffness. For example, if the workpieces 210, 220 comprised different materials, the energy directors can be placed on the lower surface 214 of the first workpiece 210, which is in contact with the welding tip 250.

According to one embodiment, when tapering the height profile of the energy directors, the energy director at the center of the energy transfer area 260 (often the center of the weld area 240) is the tallest. Specifically, a first energy director 230 (shaded for illustrative purposes) should be the tallest when compared to other energy directors within the weld area 240. Positioning the first energy director 230 at the center of the weld area 240 initiates melting of the material from the first energy director 230, filling space surrounding the first energy director 230 prior to melting of adjacent energy directors. Causing taller energy directors to melt earlier than shorter ones eliminates, or at least reduces, air pocket formation within the ultrasonic weld (e.g., weld of area 240) because space between taller and adjacent shorter energy directors is filled by melted energy director material (e.g., mostly or completely from the taller director(s)) before the adjacent energy director(s) melt. In other words, the system is designed to promote melting of distributed energy directors sequentially instead of simultaneously, thereby allowing each energy director to melt and fill remaining space surrounding the energy director.

The energy directors can be formed or selected to have any desired heights creating a tapered distribution within the weld. Additionally, energy directors can have any number of height levels—e.g., a fourth set of shorter energy directors, a fifth set, and so on.

Figure 4:
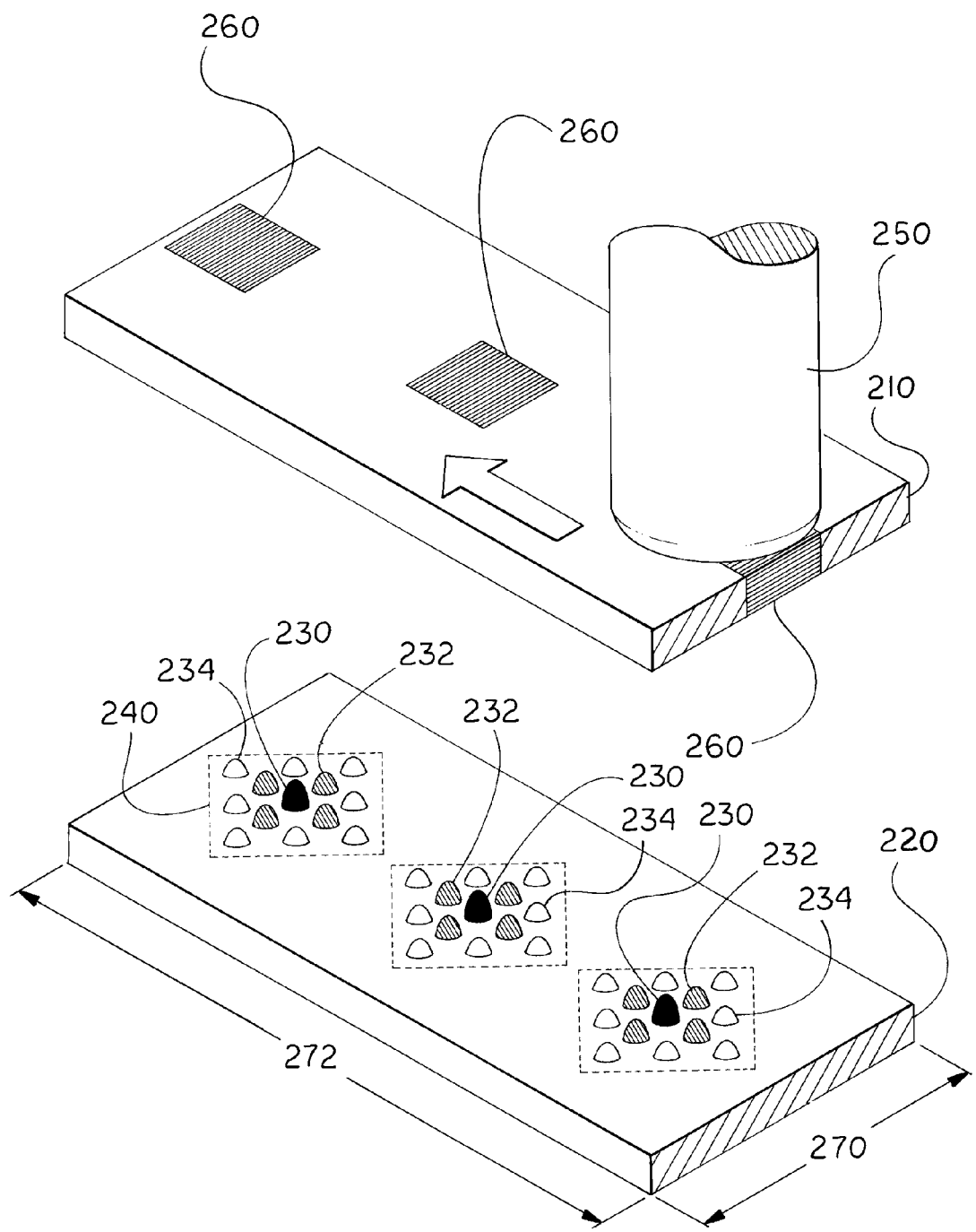
FIG. 4 illustrates a perspective view of the ultrasonic welding assembly of FIG. 3 utilizing spot energy directors with an ultrasonic weld process.

Across the weld area 240 shown in the example pattern of FIG. 4, each energy director adjacent to the first energy director 230 is shorter than the first, providing symmetry about the center of the weld area 240. Specifically, the energy director 230 is taller than a second energy director 232 (filled by hatching for illustrative purposes). Similarly, the second energy director 232 is taller than a third energy director 234. As the welding tip 250 is moved to each weld area 240, the tapering heights of the energy directors 230, 232, 234 in each area 240 cause each spot weld to be formed from the center of the weld area 240 outward.

In one embodiment, one or more of the energy directors can themselves have a tapered profile, as illustrated in FIG. 3. The tapered profile allows the energy director to melt from a center (e.g., an apex) of the energy director outward. For example, the first energy director 230 may contain an apex which melts upon release of thermal energy produced by vibration of the molecules within the apex. The thermal energy produced causes molecules in the apex to increase in temperature, thus causing melting of the first energy director 230, generally from a center of the energy director 230 outward in the energy director 230.

Figure 5:
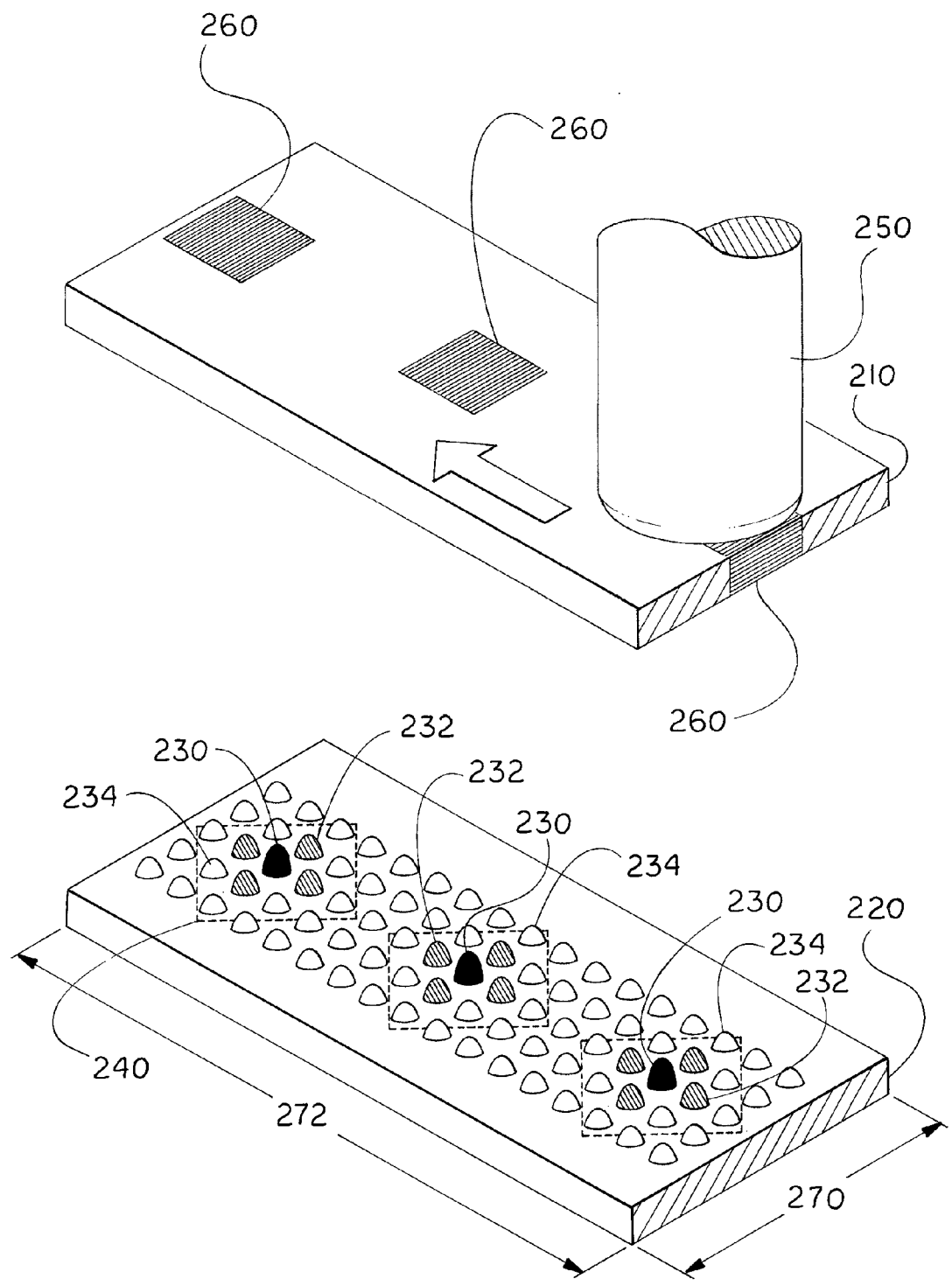
FIG. 5 illustrates a perspective view of the ultrasonic welding assembly of FIG. 3 utilizing continuous energy directors with an ultrasonic weld process.

In some embodiments, tapering the heights and/or profiles of the energy directors 230, 232, 234 form a continuous weld pattern using spot, or interval, ultrasonic welding along a weld length 272, as shown in FIG. 5. Tapering the heights and/or profiles of the energy directors can be used in applications where distance is placed between each spot weld. Distance between each spot weld can be measured from a center of one spot weld to a center of an adjacent spot weld (center-to-center).

Factors such as the size of the welding tip 250 (e.g., curvature radius of welding tip), the melting temperature of the material of the workpieces, 210, 220, and stiffness of the material of the workpieces 210, 220, among others, may affect the distance between each spot weld. As an example, the distance between each spot weld may increase or decrease as a curvature radius of the welding tip increases/decreases based on an application.

Distance can vary from about 10 millimeters (mm) to about 120 mm based on factors such as stiffness of the workpieces 210, 220 and diameter of the welding tip, among others. In one embodiment, for example, where the weld horn has a 13 millimeter (mm) diameter, the distance between welds is at least 13 mm, measured center-to-center. Furthermore, the distance could range for example from about 13 mm to about 200 mm, with an exemplary distance from about 20 mm to about 120 mm.

In some embodiments, when the continuous weld pattern is used during ultrasonic spot welding, the welding tip (e.g., welding tip 250) is located at the center energy transfer area 260, which is located at the center of the weld area 240. The first energy director 230 is located near the center of the energy transfer area 260. Surrounding the first energy director 230, is a plurality of second energy directors 232. Similarly, a plurality of third energy directors 234 surround the plurality of second energy directors 232.

When using ultrasonic spot welding to form the continuous weld pattern along a direction of travel (illustrated as an arrow in FIG. 5), the weld should be formed from the center of the weld area 240 outward. Specifically, within the weld area 240, the first energy director 230 melts filling space between the first energy director 230 and the plurality of second energy directors 232. Next, the plurality of second energy directors 232 melt filling space between the each of the plurality of second energy directors 232 and each of the plurality of third energy directors 234. Finally, the plurality of third energy directors 232 within the weld area 240 melts to fill the space between the plurality of third energy directors 232 within the weld area 240 and a plurality of third energy directors 232 not within the weld area 240. Once the energy directors 230, 232, 234 within the weld area 240 melt, the plurality of third energy directors 234 located outside of the weld area 240 are melted, from energy transferred from the energy directors within the weld area 240 and/or from energy from an expanding energy transfer area 260 during each spot weld.

As shown in FIG. 5, energy directors may be located outside of the weld area, allowing formation of the continuous weld pattern with the use of ultrasonic spot welding. In some embodiments, the energy directors located outside of the weld area 240 can all be the same height. For example, as shown in FIG. 5, the energy directors located outside of the weld area 240 are sized as the third energy director 234.

In other embodiments, the energy directors located outside of the weld area 240 can be tapered in height to facilitate sequential melting of energy directors outside of the weld area 240. Additionally, where the energy directors outside of the weld area 240 are tapered, multiple rows of ultrasonic spot welds, formed along the direction of travel, can be formed where each row of ultrasonic spot welds is offset from other rows.

Figure 6:
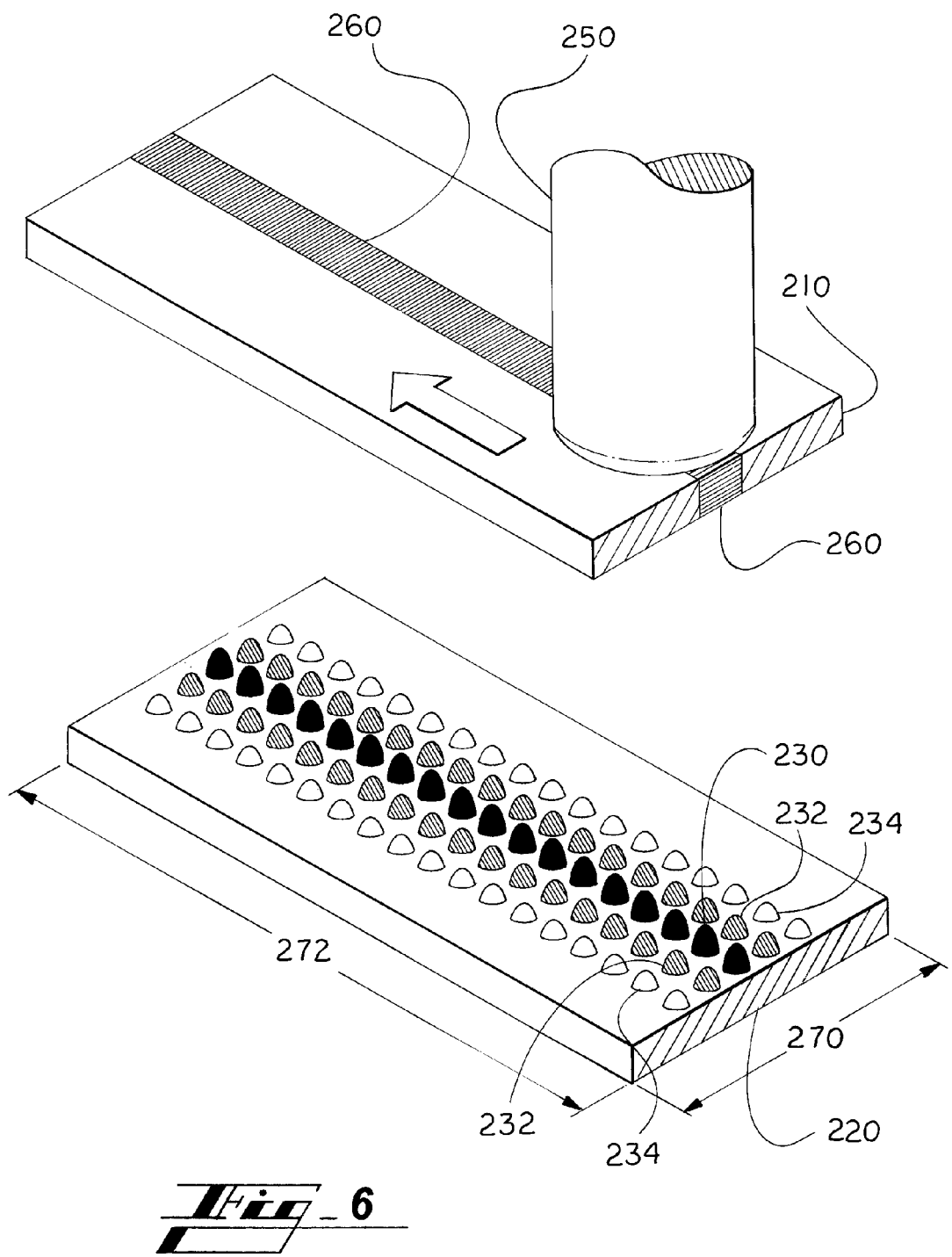
FIG. 6 illustrates a perspective view of the ultrasonic welding assembly of FIG. 3 utilizing an alternative ultrasonic weld process.

In some embodiments, the profiling of the energy directors 230, 232, 234 may repeat along the weld length 272 to form a continuous weld pattern using continuous ultrasonic welding as shown in FIG. 6. Specifically, the first energy director 230 is located at the center of the weld width 270 near the energy transfer area 260. Along the weld width 270 on either side of the first energy director 230 is the second energy director 232. Similarly, next to each of the second energy directors 232 are the third energy director 234 along the weld with. The pattern along the weld width 270, having the first energy director 230 located at the center and decreasing in energy director height therefrom, repeats along the weld length 272.

By repeating the profiling of the energy directors 230, 232, 234 along the weld length 272, air pockets are reduced/eliminated along the weld length 272. When using continuous ultrasonic welding to form the continuous weld pattern along a direction of travel (illustrated as an arrow in FIG. 6), the weld should be formed from the center of the weld width 270 outward and continue along the weld length 272. Specifically, the first energy director 230 melts filling the space around the first energy director 230. Then the second energy directors 232 melt followed by the third energy directors 234. This sequential melting of the energy directors 230, 232, 234 occurs along the weld length 272.

Although the energy directors 230, 232, 234 are illustrated within the figures as rounded in shape, one of skill would appreciate that the energy directors can be shaped according to varying geometric shapes such as, but not limited to, square, triangular, and trapezoidal, among others. The process described below can be applied to energy directors of differing shapes and sizes, as long as the energy directors are tapered in height, with the tallest energy director positioned at the center energy transfer area 260.

B. Welding Tip

Another way to direct ultrasonic energy towards the center of the weld width 270 is to utilize a welding tip 250, shown in FIGS. 3 through 7. Unlike conventional beveled-edge or chamfered-edge welding tips, the welding tip 250 is shaped to produce the energy transfer area 260, which minimize initial contact with the first workpiece 210. Minimizing initial contact concentrates ultrasonic energy transfer through the first workpiece 210 to the first energy director 230.

The welding tip 250 can include, for example, a rounded taper profile, as shown in FIGS. 3-7. When the welding tip 250 has the rounded taper profile, the welding tip 250 is similar to that of a hemisphere. The rounded taper profile has a curvature radius 252 (shown in FIG. 3), which is a radius of an imaginary circle where an arc of the imaginary circle best fits the curve of the surface of the welding tip 250. The curvature radius 252 can be between about 25 mm and about 200 mm, with an exemplary radius between about 50 mm and about 100 mm.

The rounded taper profile can also be defined according to a curvature distance 254 (shown in FIG. 3), which is a distance separating an edge of the welding tip 250 from the upper surface 212 of the first workpiece 110. The curvature distance 254 may be between about 200 micrometers (μm) and about 2 mm. For example, where curvature radius 252 is approximately 200 mm, the curvature distance 254 may be about 200 μm. However, where curvature radius 252 is approximately 25 mm, the curvature distance 254 may be about 1.5 mm.

The welding tip 250 creates contact on the upper surface 212 of the first workpiece 210, forming the energy transfer area 260, which is an area where thermal heat produced by ultrasonic vibrations of the welding tip is transferred through the first workpiece 210. Contact created between the welding tip 250 and the upper surface 212 is reduced due to the rounded taper profile when compared to conventional techniques, thereby reducing the energy transfer area 260 generated upon initial contact with the upper surface 212. Reducing the energy transfer area 260 generated upon initial contact is beneficial because as welding continues, material within the first workpiece 210 softens allowing additional area of the welding tip 250 to contact the first workpiece 210. Additional contact with the welding tip 250 inherently increases the size of the energy transfer area 260 over time and promotes melting of the energy directors 230, 232, 234 sequentially, as shown in FIG. 7 and described below.

In some embodiments, the welding tip 250 is used independent of energy directors to reduce air pockets formed due to minor variations in the surfaces of the workpieces 210, 220, causing air to be trapped within the joint being formed. The welding tip 250 promotes weld formation that begins at a center of the energy transfer area 260. The weld progresses from the center of the energy transfer area 260 outward within the joint being formed.

In some embodiments, the welding tip 250 can be used in conjunction with the rounded tapered profile of the energy directors 230, 232, 234 to direct ultrasonic energy towards the center of the weld width 270. In these embodiments, the rounded taper profile of the welding tip 250 should be inverse of the profiling of the energy directors 230, 232, 234. For example, if the first energy director 230 is located at the center of the weld width 270, then the welding tip 250 should be shaped such that contact created between the welding tip 250 and the upper surface 212 of the first workpiece 210 is approximately near the first energy director 230.

Although the welding tip 250 is illustrated as rounded (hemispherical) in shape, one of skill would appreciate that the welding tip can be shaped according to varying geometric shapes, such as pyramidal. The process described below can be applied to welding tips of differing shapes and sizes, as long as the tip provides directed ultrasonic energy towards the center of the weld width 270.

II. Process for Ultrasonic Welding—FIG. 7

FIG. 7 illustrates a process of ultrasonic welding using the exemplary ultrasonic welding assembly of FIG. 3.

At step 200, the first workpiece 210 is positioned in contact with the second workpiece 220 that contains the energy directors 230, 232, 324 with tapered heights and/or tapered profiles. A welding tip 250 is positioned approximately near the upper surface 212 of the first workpiece 210.

At step 203, the welding tip 250 comes in contact with the upper surface 212 of the first workpiece 210, creating the energy transfer area 260. The energy transfer area 260 begins by increasing the temperature of the first energy director 230, which causes molecules within the first energy director 230 to vibrate and produce thermal energy that melts the first energy director 230. The melting of the first energy director 230 causes an increase in temperature of the second energy directors 232 on either side of the first energy director 230. The increase in temperature causes the molecules within the second energy directors 232 to vibrate and produce thermal energy that melts the second energy directors 232. Similarly, an increase in temperature of the third energy directors 234, from melting of the second energy directors 232, causes vibration of molecules which produces thermal energy that melts the third energy directors 236.

As shown at step 206, the lower surface 214 of the first workpiece 210 increases contact with the energy directors 230, 232, 234. Additionally, as material of the first workpiece 210 softens, the welding tip 250 increases contact with the upper surface 212 of the first workpiece 210.

Increased contact of the welding tip 250 with the upper surface 212 of the first workpiece 210 increases the size of the energy transfer area 260 over time, which melts energy director 230, 232, 234 in stages, thus reducing or eliminating the possibility of air gaps. Specifically, after the process commences (e.g., step 203), the energy transfer area 260 forms where the welding tip 250 is positioned adjacent to the first workpiece 210. As the process continues (e.g., step 206), the energy transfer area 260 expands through material of the first workpiece 210. The energy transfer area 260 may expand through some or all of the first workpiece 210, the second workpiece 220, and/or the energy directors 230, 232, 234 (not shown). The size of the energy transfer area 260 expansion can depend on factors such as material composition of the workpieces 210, 220, material composition of the energy directors 230, 232, 234, and time the welding tip 250 is in contact with the first workpiece 210, among others.

The resultant weld, shown at step 209 is free of air gaps. The elimination of air gaps inherently increases the integrity of the ultrasonic weld.

III. SELECTED FEATURES

Many features of the present technology are described herein above. The present section presents in summary some selected features of the present technology. The present section highlights only a few of the many features of the technology and the following paragraphs are not meant to be limiting.

One of many benefits of the present technology is the ability to form high-integrity, highly-robust, ultrasonic welds being void free or at least having very-low amount of voids as compared to conventional techniques. Welds without voids are stiffer and stronger. Using a tapered-shape welding tip, tapered-shape energy directors, and/or tapered-energy-director profiling reduces and/or eliminates the likelihood of trapping air in the ultrasonic welds.

An aspect of the present technology is formation of an ultrasonic weld from a center of a weld width, or weld area, towards edges of the weld width or area. Forming the weld from the center of the weld width or area promotes the energy directors melting in predesigned stages, thereby filling area gaps, instead of melting energy directors at the same time, as done in the conventional designs.

IV. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A method, for joining a first workpiece and a second workpiece, comprising:
    providing the first workpiece, the second workpiece, and a group of energy directors, yielding a system, wherein the group of energy directors comprise:
        a first energy director having a first height;
        a second energy director having a second height, being less than the first height, and positioned adjacent the first energy director; and
        a third energy director having the second height and positioned adjacent the first energy director, and
    wherein the group of energy directors are positioned between the first workpiece and the second workpiece for being melted in response to application of energy to the system; and
    applying energy to at least one of the workpieces to melt the group of energy directors, wherein melting of the energy directors of the group is commenced sequentially, based on respective heights of the energy directors, wherein melting of the first energy director commences before melting of the second director and the third energy director commences, forming a substantially void-free weld between the first workpiece and the second workpiece.

2. The method of claim 1 wherein the first workpiece is configured to receive the input energy and at least one of the group of energy directors is positioned at the first interface surface of the first workpiece.

3. The method of claim 1 wherein the energy directors, in being configured to melt sequentially, based on respective heights of the energy directors, are configured so that the input energy generally concentrates initially at a center portion of a weld area at which the first workpiece and second workpiece are joined using the energy directors.

4. The method of claim 3 wherein at least one of the group of energy directors comprises a tapered height such that input energy to the weld area melts at least one of the group energy directors prior to the remaining energy directors of the group of energy directors.

5. The method of claim 4 wherein:
at least one of the energy directors comprising a first material,
at least one of the energy directors comprising a second material, and
the energy directors being configured to melt sequentially, based on respective heights of the energy directors, such that the input energy generally concentrates initially at the energy director comprising the first material before reaching the energy director comprising the second material.

6. The method of claim 1 wherein the system comprises a hemispherical welding tip configured to promote concentration of energy emitted from the hemispherical welding tip toward at least one of the energy directors.

7. A system, for joining a first workpiece and a second workpiece, comprising:
a group of energy directors configured to be positioned at one of a first interface surface of the first workpiece and a second interface surface of the second workpiece, the group of energy directors comprising:
a first energy director having a first height;
a second energy director having a second height, being less than the first height, and positioned adjacent the first energy director; and
a third energy director having the second height and positioned adjacent the first energy director,
wherein the group of energy directors join together, by a substantially void-free weld in a weld area of the system, the first interface surface of the first workpiece and the second interface surface of the second workpiece during operation of the system, and
wherein the group energy directors, in being configured to be positioned at one of the first interface surface and the second interface surface for joining the first interface surface and the second interface surface, are configured to, based on respective heights of the energy directors, melt the first energy director before melting the second director and the third energy director in response to application of input energy to form the substantially void-free weld within the weld area during operation of the system.

8. The system of claim 7 further comprising the first workpiece and the second workpiece, wherein the first workpiece is configured to receive the input energy and at least one of the group of energy directors is positioned at the first interface surface of the first workpiece.

9. The system of claim 7 wherein the energy directors, in being configured to melt sequentially, based on respective heights of the energy directors, are configured so that the input energy generally concentrates initially at a center portion of the weld area.

10. The system of claim 9 wherein each of the energy directors include a tapered height such that the input energy into the weld area melts at least one of the group energy directors prior to the remaining energy directors of the group of energy directors.

11. The system of claim 10 wherein:
at least one of the energy directors comprising a first material,
at least one of the energy directors comprising a second material, and
the energy directors being configured to melt sequentially, based on respective heights of the energy directors, such that the input energy generally concentrates initially at the energy director comprising the first material before reaching the energy director comprising the second material.

12. The system of claim 7 wherein the system comprises a hemispherical welding tip configured to promote concentration of energy emitted from the hemispherical welding tip toward at least one of the energy directors.

13. A system, for joining a first workpiece and a second workpiece, comprising:
a first energy director having a first height;
a second energy director having a second height, being less than the first height, and positioned adjacent the first energy director; and
a third energy director having the second height and positioned adjacent the first energy director,
wherein the first energy director, the second energy director, and the third energy director are configured to be positioned at one of a first interface surface and a second interface surface to join the first interface surface and the second interface surface and configured to melt sequentially, based on respective heights of the energy directors, the first energy director before melting the second director and the third energy director in response to application of energy to input form a substantially void-free weld within a weld area during operation of the system.

14. The system of claim 13 further comprising the first workpiece and the second workpiece, wherein the first workpiece is configured to receive the input energy and at least one of the plurality of energy directors is positioned at the first interface surface of the first workpiece.

15. The system of claim 13 wherein the energy directors, in being configured to melt sequentially, based on respective heights of the energy directors, are configured so that the input energy generally concentrates initially at a center portion of the weld area.

16. The system of claim 13 wherein the system comprises a hemispherical welding tip configured to promote concentration of energy emitted from the hemispherical welding tip toward the first energy director.

17. The method of claim 1 wherein the group of energy directors further comprises a fourth energy director having a third height and configured to be positioned adjacent the second energy director.

18. The method of claim 17 wherein the group of energy directors further comprises a fifth energy director having the third height and configured to be positioned adjacent the third energy director.

19. The system of claim 7 wherein the group of energy directors further comprises a fourth energy director having a third height and configured to be positioned adjacent the second energy director.

20. The system of claim 19 wherein the group of energy directors further comprises a fifth energy director having the third height and configured to be positioned adjacent the third energy director.

* * * * *